United States Patent [19]
Walsh et al.

[11] Patent Number: 5,604,608
[45] Date of Patent: Feb. 18, 1997

[54] DEVICE AND METHOD FOR CONTROLLING THE SCAN SPEED OF AN IMAGE INPUT TERMINAL TO MATCH THE THROUGHPUT CONSTRAINTS OF AN IMAGE PROCESSING MODULE

[75] Inventors: John F. Walsh; James W. Stevens, both of Rochester, N.Y.

[73] Assignee: Xerox Corporation, Stamford, Conn.

[21] Appl. No.: 535,598

[22] Filed: Sep. 28, 1995

[51] Int. Cl.$^6$ ............................. H04N 1/04; G06F 15/00
[52] U.S. Cl. .......................... 358/486; 358/468; 395/872; 395/881
[58] Field of Search ..................... 358/486, 494, 358/404, 405, 437, 444, 442, 412, 296, 479; 395/165, 250, 821, 868, 872, 875, 881; H04N 1/04

[56] References Cited

U.S. PATENT DOCUMENTS

| | | | |
|---|---|---|---|
| 3,428,744 | 2/1969 | Green et al. | 178/6 |
| 3,436,474 | 4/1969 | Saeger et al. | 178/7.1 |
| 3,502,803 | 3/1970 | Beginwald et al. | 178/6.6 |
| 3,524,926 | 8/1970 | Starr et al. | 178/6 |
| 3,902,009 | 8/1975 | Perreault | 178/6 |
| 4,279,002 | 7/1981 | Rider | 358/296 |
| 4,513,390 | 4/1985 | Walter et al. | 358/483 |
| 4,541,061 | 9/1985 | Schoon | 364/518 |
| 4,587,415 | 5/1986 | Tsunekawa et al. | 250/204 |
| 4,628,368 | 12/1986 | Kurata et al. | 358/293 |
| 4,641,357 | 2/1987 | Satoh | 358/483 |
| 4,878,119 | 10/1989 | Beikirch et al. | 358/471 |
| 4,910,607 | 5/1990 | Kita et al. | 358/448 |
| 5,021,892 | 6/1991 | Kita et al. | 358/448 |
| 5,043,827 | 8/1991 | Beikirch | 358/471 |
| 5,113,260 | 5/1992 | Tandon | 358/213.11 |
| 5,278,974 | 1/1994 | Lemmon et al. | 395/550 |
| 5,369,504 | 11/1994 | Walker | 358/437 |
| 5,528,374 | 6/1996 | Matias | 358/437 |

*Primary Examiner*—Edward L. Coles, Sr.
*Assistant Examiner*—Madeleine A. Nguyen
*Attorney, Agent, or Firm*—Michael J. Nickerson

[57] ABSTRACT

An image input terminal synchronously transfers image data to an image processing system when the effective image data generation rate of the image input terminal exceeds the throughput rate of the image processing system. The image input terminal scans the document at a constant rate, but the constant rate is slower than the normal scan rate for the image input terminal, thereby effectively scanning the document at a higher resolution. To realize an effective image data generation rate equal to the throughput rate, the image input terminal periodically discards D scanlines or skips N-D scanlines of valid image data to give the image processing system ample time to complete the processing of valid image data. The image input terminal, to facilitate a synchronous transfer of image data, will skip D scanlines of valid image data out of N scanlines of valid image data.

15 Claims, 11 Drawing Sheets

DEVICE AND METHOD FOR CONTROLLING THE SCAN SPEED OF AN IMAGE INPUT TERMINAL TO MATCH THE THROUGHPUT CONSTRAINTS OF AN IMAGE PROCESSING MODULE

FIELD OF THE PRESENT INVENTION

The present invention is directed to a device or method for transferring scanned video data between an image input terminal and an image processing module. More specifically, the present invention is directed to controlling the scanning speed of an image input terminal when the image data generation rate of the image input terminal exceeds throughput constraints of the image processing module.

BACKGROUND OF THE PRESENT INVENTION

Raster input scanners typically employ one or more arrays such as CCDs for scanning. The array converts each scanned image line into a series of charges which, following suitable processing, are output as image signals or pixels to an end user. The scanning array, for example, may be carried on a carriage which traverses back and forth under a platen to provide the necessary relative motion between the image and array. Other arrangements such as a half rate/full rate system of mirrors and lamp(s) which reflect the image into a stationary array, a lamp scanning array with a movable document, etc., may also be utilized. An optical system focuses the reflected image onto the array, and one or more lamps provide illumination of the image.

In a typical scanning process, the image area viewed by each array of photosensors is converted into a charge potential representative of the image's gray level. Scanning takes place during an integration period of a preset duration. Following integration, the image charges are transferred to a pair of analog shift registers, the operating sequence being such that during the integration period, the image charges (image data) from a previous scanline are clocked from the shift registers, leaving the shift registers free to receive the image charges from the next integration period. The duration of the integration period, which must be sufficiently long to fully integrate the image line being scanned yet not so long as to allow the array of of photosensors to become saturated, is measured by a periodic fixed rate clock signal or shift pulses.

When the scanner operates in a synchronized manner, relative scanning movement between the array and images are at a fixed rate. This in turn permits timing of the shift pulses in the signal requesting the next line of image signals, referred to as the integration signals, to be synchronized with one another.

However, when a scanner operates asynchronously; i.e., when the image data generation rate of the image input terminal is faster than the data processing rate of the device receiving the image data; the relative scanning movement between the array and image is not fixed, but random and changes with demand. In other words, the signals are produced in response to the movement of the array or document. As a result, the timing of the integration signal timing can vary and not be synchronized with the fixed rate shift pulses. This can reduce the integration period, resulting in an incomplete integration of the image line being scanned.

Many methods and devices have been developed which provide asynchronous transfer when there is a difference in the transfer rate between the sending and receiving devices and also address the incomplete integration problem. These various approaches will be briefly discussed below.

U.S. Pat. No. 4,541,061 to Schoon discloses an approach wherein the operating clock signal of a scanning apparatus is provided at a rate that matches the varying velocity of the scanning mirror through the use of a memory in which various clock rates are stored based on the known repetitive movement of the mirror. The entire contents of this U.S. Patent are hereby incorporated by reference.

Another approach has been proposed in U.S. Pat. No. 4,587,415 to Tsunekawa et al. This U.S. Patent discloses a photodetector with a timing control unit for controlling the information storage and information read out process of the detector. The entire contents of this U.S. Patent are hereby incorporated by reference.

Moreover, U.S. Pat. No. 4,628,368 to Kurata et al. discloses a system for controlling the scanning rate of a document reader in which the speed, acceleration, and the deceleration of the reader are set according to image information stored in a buffer memory. The entire contents of this U.S. Patent are hereby incorporated by reference.

U.S. Pat. No. 5,043,827 to Beikirch disclose a scanning system which corrects for incomplete integration. The scanning system utilizes an interpolator to provide a composite line of image signals when an integration period is prematurely terminated. The entire contents of this U.S. Patent are incorporated by reference Furthermore, U.S. Pat. No. 4,878,119 to Beikirch et al. discloses a process for operating a scanning array asynchronously. The array has at least one row of sensors for scanning an image viewed by the array during an integration period and a shift register for receiving the signal charges developed by the sensor following the integration period. This process includes periodically generating, at a constant clock rate, integration pulses defining a succession of predetermined integration intervals and generating a start integration signal in response to a demand for a line of image signals where the time at which the start integration signals occurs is different than the time at which the integration pulses occur. The process interrupts the current integration interval in response to a start integration signal to commence a new integration interval to provide the asynchronous transfer of a line of image signals. The entire contents of this U.S. Patent are hereby incorporated by reference.

By using asynchronous stop/stop scanning, the optical system or documents are slowed down or stopped completely until an output buffer in the image input terminal is empty enough to resume scanning. The video data timing is not synchronous to a fixed clock, but is dependent upon the motion control system. This involves a more complex control system and has motion and image quality issues associated therewith.

In addition to an asynchronous transfer system, a large memory buffer can be used in the image input terminal to address the problem of differing transfer rates. In this situation, a complete page can be stored in resident memory and transferred at the rate utilized by the interface of the host. However, this technique increases the cost to the system in terms of additional components call on power consumption, and the physical space required by the page memory.

A problem exists when attempting to transfer scanned video data between an image input terminal and an image processing module when the image data generation rate of the image input terminal exceeds the image processing rate of the module or when attempting to transfer video data scanned at a higher resolution which would require the image processing module to increase its rate of throughput so as to maintain its rated speed. Rated speed being the speed of obtaining a scanline of data under normal operating conditions. For example, a scanner may have a rated speed of 40 scans per minute at 600 spots per inch (spi) but its speed would be 20 scans per minute if the scanner scanned at 1200 spi, if the image processing module did not increase its throughput rate.

Another problem associated with transferring of data is the limited bandwidth of a synchronous clock image input terminal/image processing module when the image input terminal outputs various types of image data; i.e., text, halftones, continuous tones, etc. Each different type of data may require different processes which can affect the throughput rate of the image processing module. An example is an image input terminal which produces a mixture of text and continuous tones. When processing the text data, the image processing module may operate at one throughput rate, while operating at another rate when processing the continuous tones. The operating at two different rates causes a conventional scanner to use an asynchronous transfer operation to manage the scanning of an image. As noted before a synchronous process is preferred over an asynchronous process.

To prevent or avoid these various problems, the present invention scans at a slower speed with the same integration time; i.e., a higher resolution, and periodically discards or skips a selected number of scanlines of valid image data to cause the scanner to realize a virtual or apparent image data generation rate which is equal to or less than the maximum throughput rate of the image processing module.

SUMMARY OF THE PRESENT INVENTION

One aspect of the present invention is a system for transferring video data from an image input terminal to an image processing module, the image processing module having a throughput rate slower than a data generation rate of the image input terminal. The system includes input means for inputting a scanning parameter; control means for setting a scanline parameter N and a discard parameter D based on the received scanning parameter and maximum image processing module throughput; image means, operatively connected to the control means, for scanning a predetermined portion of the image and for producing a set of N scanlines of valid image data therefrom; buffer means, operatively connected to the control means, for storing N-D scanlines of valid image data; and interface means, operatively connected to the buffer means, for outputting the stored scanlines of image data to the image processing module.

Another aspect of the present invention is a method for transferring video data from an image input terminal to an image processing module, the image processing module having a throughput rate slower than a data generation rate of the image input terminal. The method inputs a scanning parameter; sets a scanline parameter N and a discard parameter D based on the received scanning parameter and maximum image processing module throughput; scans a predetermined portion of the image and for producing a set of N scanlines of valid image data therefrom; stores N-D scanlines of valid image data; and outputs the stored scanlines of image data to the image processing module.

A third aspect of the present invention is a system for transferring video data from an image input terminal to an image processing module, the image processing module having a throughput rate slower than a data generation rate of the image input terminal. The system includes control means for setting an initial scanline parameter N and an initial discard parameter D; image means, operatively connected to the control means, for scanning a predetermined portion of the image and for producing a set of N scanlines of valid image data therefrom; buffer means, operatively connected to the control means, for storing N-D scanlines of valid image data; interface means, operatively connected to the buffer means, for outputting the stored scanlines of image data to the image processing module; image processing module output means for producing a signal when an image data generation rate of the image input terminal exceeds an image throughput rate of the image processing module. The control means resets the scanline parameter N and discard parameter D to new values and causes the imaging means to re-scan the image according to the newly set parameters.

Further advantages of the present invention will become apparent from the following description in the various features of the present invention.

BRIEF DESCRIPTION OF THE DRAWINGS

The following is a brief description of each drawing used to describe the present invention, and thus, are being presented for illustrative purposes only and should not be limited of the scope of the present invention, wherein.

DETAIL DESCRIPTION OF THE PRESENT INVENTION

The following will be a detailed description of the drawings illustrating the present invention. In this description, as well as in the drawings, like reference numbers represent devices, circuits, or equivalent circuits which perform the same or equivalent functions.

Figure 1:
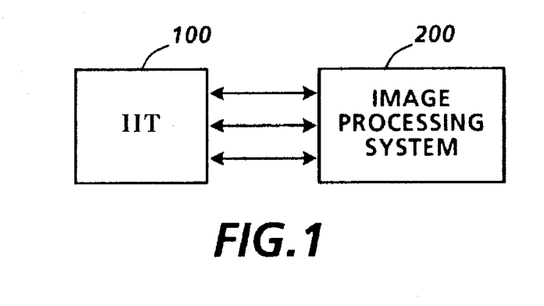
FIG. 1 is a block diagram illustrating the relationship between an image input terminal and an image processing module.

FIG. 1 illustrates a relationship between an image input terminal 100 and an image processing system 200. The image input terminal (IIT) 100 converts an image reflected from a document into electrical signals. These electrical signals (video data) are then transferred to the image processing system 200 serially or in parallel.

To synchronously transfer image data from the IIT 100 to the image processing system 200, the effective image data generation rate of the IIT terminal 100 must be less than or equal to the throughput rate of the image processing system 200. In other words, a synchronous transfer of data from the IIT 100 to the image processing system 200 implies that scanner of the IIT 100 scans the image at a constant rate, using a constant integration time, without having to wait or stop the scanning process to allow the image processing system an opportunity to receive all the image data of a previous scanline prior to the scanner producing the next new scanline of valid image data.

Figure 2:
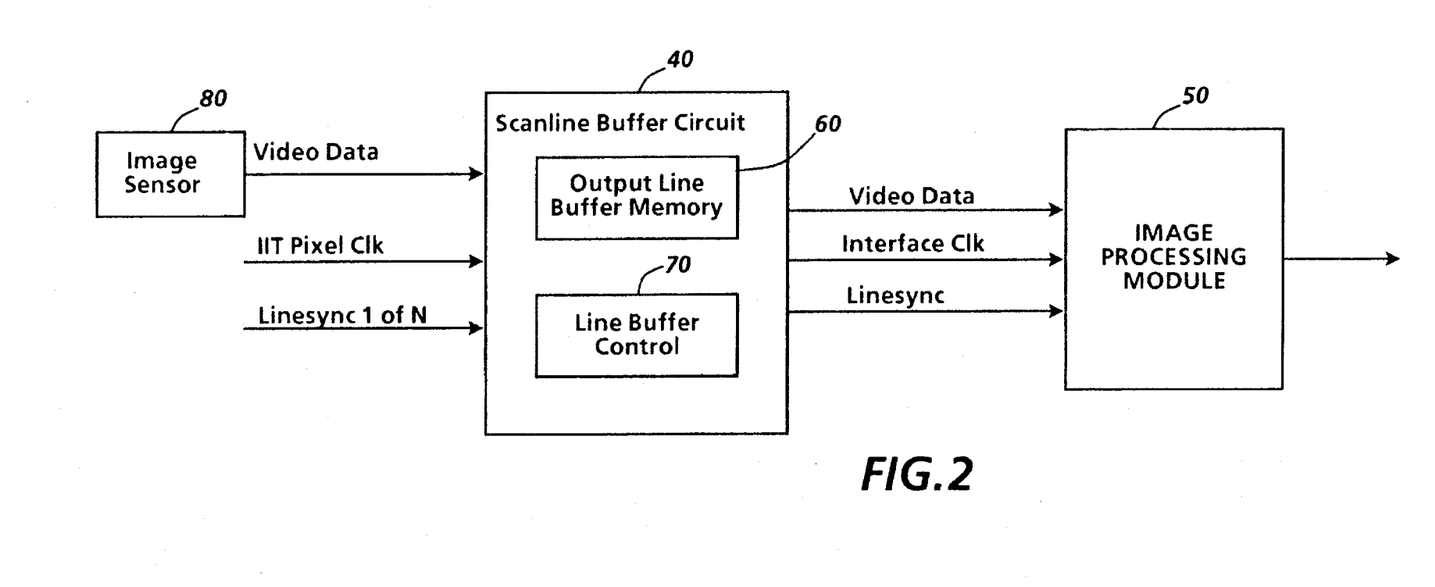
FIG. 2 is a block diagram illustrating the circuit for buffering the video data from the image input terminal.
Figure 5:
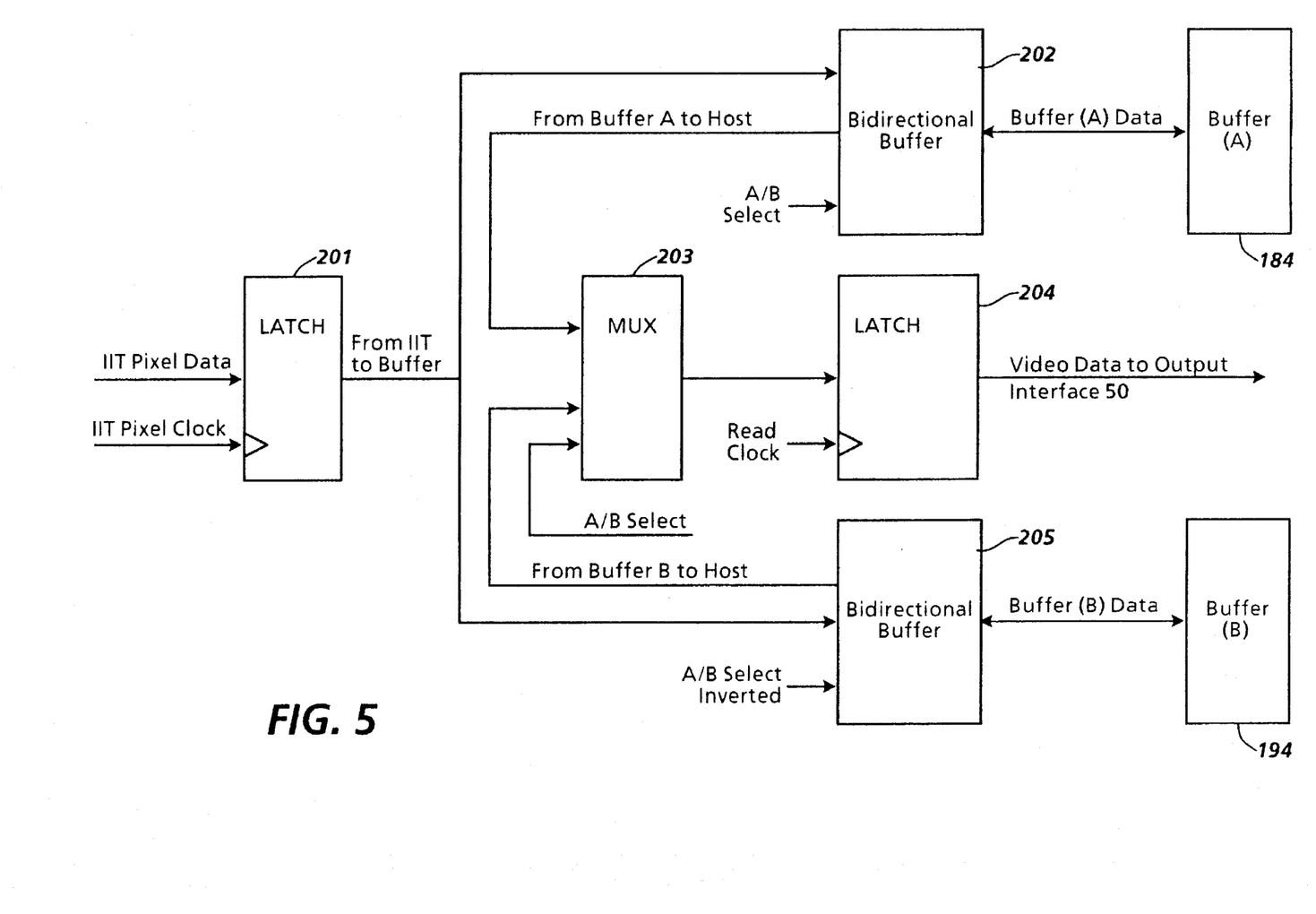
FIG. 5 is a block diagram illustrating a data transfer buffer circuit of another embodiment of the present invention.

FIG. 2 illustrates a circuit used in buffering the video data received from an image sensor 80 before the video data is transferred to an image processing module 50. As illustrated in FIG. 2, video data generated by the image sensor 80 is input to a scanline buffer 40. Scanline buffer 40 includes a line buffer memory 60 and a line buffer control circuit 70. The scanline buffer memory 60, in one embodiment of the present invention, is two separate scanline buffers which act in tandem to ensure proper transfer of the video data from the image sensor to the image processing module 50. The separate scanline buffers are only one possible embodiment of the present invention are illustrated in FIG. 5.

During the proper buffering of video data, one of the scanline buffers receives video data from the image sensor 80 and temporarily stores this video data within its memory array, while the other scanline buffer outputs video data from a previous scanline to the image processing module 50. The operations of the scanline buffers are controlled by the line buffer control circuit 70, in accordance with received image input terminal pixel clock signal and linesync 1 of N signal. The input terminal pixel clock signal enables the line buffer control circuit 70 to write individual pixels of video data into the scanline buffer 60. Moreover, the linesync 1 of N signal informs the line buffer control circuit 70 when the next scanline of video data will be input for buffering.

Figure 3:
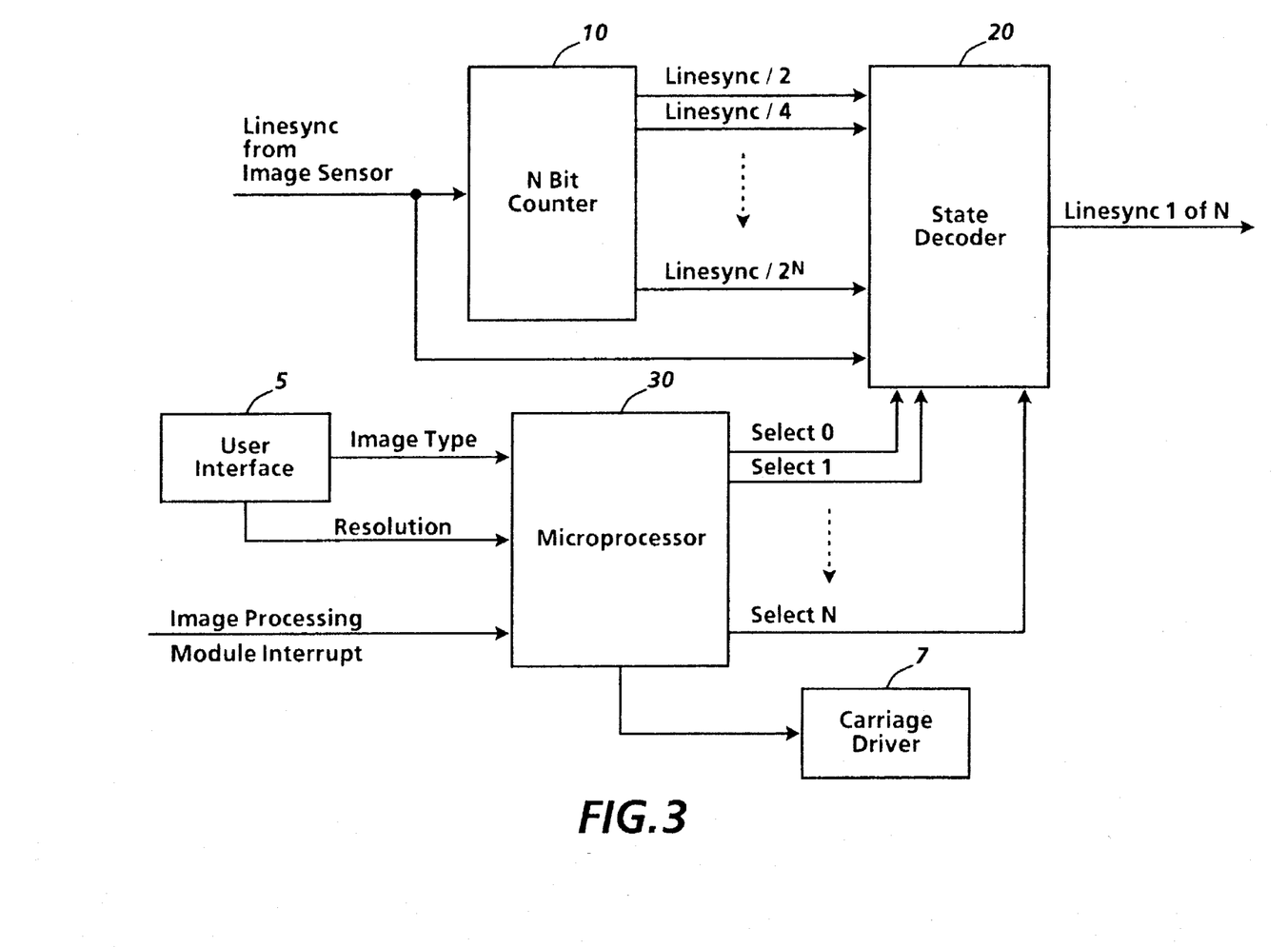
FIG. 3 is a block diagram illustrating a circuit for controlling the buffering operations of the present invention.

FIG. 3 illustrates a circuit for determining which scanlines of video data from the image sensor 80 are to be transferred to the image processing system and thus which scanlines of video data will be temporarily stored by a scanline buffer 105a. In FIG. 3, a linesync signal from the image sensor 80 is input into an N-bit counter 10 and a state decoder 21. The N-bit counter 10 outputs binary signals representing a relative scanline number within a set of scanlines. In other words, if the second scanline after resetting the counter (the counter is reset after the counter reaches its maximum count) is being scanned by the image sensor 80, the N-bit counter will output a logically active signal on the linesync/2 data line. Moreover, if the image sensor 80 is scanning the fourth scanline after resetting the counter, the N-bit counter 10 will output a logically active signal on the linesync/2 data line and the linesync/4 data line.

The state decoder 20 receives the input signals from the N-bit counter 10 and input signals from a microprocessor 30. The state decoder 20, from the inputs, determines which single scanline of valid data out of N scanlines of valid data is to be transferred to the image processing system and which scanlines out of the N scanlines of valid image data are to be discarded, skipped, or prevented from being temporarily stored in a scanline buffer. When the linesync 1 of N signal is logically active, the state decoder 20 indicates that the scanline of valid image data being presented to a scanline buffer should be temporarily stored in this buffer.

The number of discarded scanlines D, per number of scanlines N is predetermined according to the difference between the normal or rated image data generation rate of the IIT and the rated throughput of the image processing system. The resolution at which the image is to be scanned, the size of the image, the type of the image, and the number of bits per pixel are also factors in determining D and N. For example, if the rated image data generation rate is 50 MHz (50,000,000 bytes (pixels) per second) at 600 spi from image sensor 80 and the rated throughput of image processing module 50 is 50 MHz (50,000,000 bytes (pixels) per second) and the image is scanned at 1200 spi, N would equal 2. On the other hand, same as before except the image is scanned at 1800 spi, N would be equal to 3. Thus, N is a whole number related to the proportional relationship between the generation and throughput rates.

The line skipping routine utilized by the present invention is fully described in copending U.S. patent application Ser. No. 08/222,200, filed Apr. 1, 1994, and entitled "Method And System For Transferring Image Data Between Two Devices Having Different Bandwidths" The entire contents of U.S. patent application Ser. No. 08/222,200 are hereby incorporated by reference.

Moreover, if half the number of scanlines generated by the image sensor are desired to pass through the system, the microprocessor produces signals which causes the state decoder to produce an active level logical state image sensor linesync signal for every second state of the N-bit counter i.e. (N=2, D=1). If every fourth line of video is desired, the microprocessor produces signals which causes the decoder to select an image sensor linesync signal corresponding to every fourth state of the N-bit counter i.e. (N=4, D=3). Moreover, if a 400 line per inch image is desired at half of the normal scanline rate of the image input terminal, the optical system or the document is moved at a velocity which would generate a 800 line per inch image of which every other scanline of valid image data is discarded.

The microprocessor 30 determines N and D from input it receives from a user interface 5 and automatically corrects N and D during or after the scan if told to do so by the image processing module through an image processing module output signal(s).

More specifically, according to one embodiment of the present invention, the user interface 5 will enable a user to select a resolution and/or input information regarding the image type. For example, if the image processing system for the scanner has a maximum throughput rating for processing a 600 spi image (N=1, D=0) and the user chooses, through the user interface, directly or indirectly, to scan and produce an image at 1200 spi resolution; the microprocessor will set the discard parameter to 1 (D=1) and the scanline parameter to 2 (N=2) and control the carriage drive 7 accordingly. Also, if the rated state (N=1, D=0) refers to the throughput rate for processing text type images and the user, through the user interface, directly or indirectly indicates a halftone image; the microprocessor knowing the throughput rate of the image processing system for halftone images will set N and D accordingly and control the carriage driver 7 accordingly.

According to another embodiment of the present invention, if the image processing system finds that the image data generation rate is exceeding its throughput rate, the image processing system will send an output signal(s) or interrupt to the microprocessor 30 which will restart the scanning process utilizing a higher N in conjunction with a lower imaging rate. This process can be repeated until the image data generation rate does not exceed the throughput rate. The re-scan is in either the same direction starting at the original start position or is carried out in the opposite direction on a retrace of the image.

FIG. 5 illustrates a scanline buffer data transfer circuit for an embodiment of the present invention. Pixel data from the image input terminal (IIT) is input into a latch circuit 201 which latches the data in response to an IIT pixel clock signal. The pixel data from latch 201 is output to a bidirectional buffer 202 and a bidirectional buffer 205. Bidirectional buffer 202 controls the flow of data between the IIT and Buffer(A) 184 as well as the flow of data from Buffer(A) 184 to the image processing system. An A/B select signal controls whether Buffer(A) 184 is receiving data from the IIT or is outputting data. If Buffer(A) 184 is outputting data, the data from Buffer(A) 184 is passed through bidirectional buffer 202 and input into a multiplexer 203.

Bidirectional buffer 205 operates in the same manner as bidirectional buffer 202 except that the flow of data is controlled by an inverted A/B select signal. Thus, when bidirectional buffer 202 is allowing pixel data from the IIT to be stored in Buffer(A) 184, bidirectional buffer 205 is allowing the data stored in Buffer(B) 194 to be transferred to the image processing system. The data from Buffer(B) 194 passes through bidirectional buffer 205 and is input to the multiplexer 203 when the pixel data residing in Buffer(B) 194 is to be transferred. Multiplexer 203 selects either the data from Buffer(A) 184 or the data from Buffer(B) 194 (through the bidirectional buffers 202 and 205)in accordance with the A/B select signal. The data selected by multiplexer 203 is latched in latch circuit 204 to enable the proper transfer of the pixel data. The data from latch 204 is transferred in accordance with the throughput rate of the image processing system.

Figure 6:
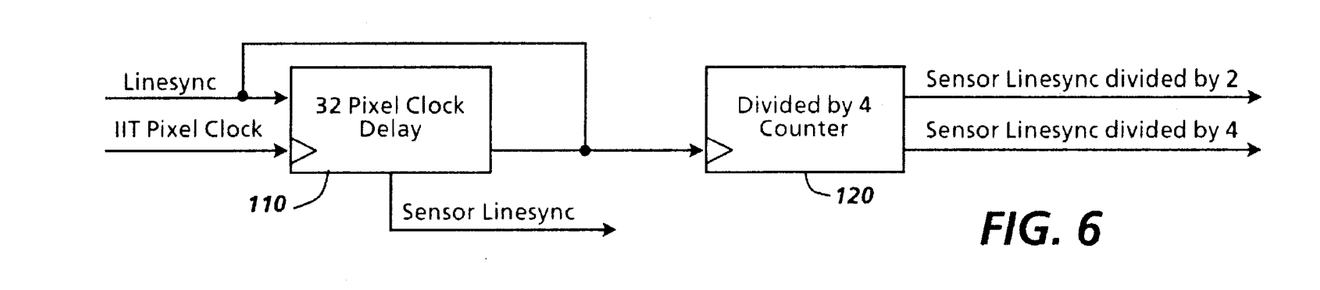
FIG. 6 is a block diagram illustrating a circuit for generating sensor linesync signals in the present invention.

FIG. 6 illustrates a circuit utilized to generate the sensor linesync signal. A linesync signal from the IIT is input into a 32 pixel clock delay circuit 110 along with the IIT pixel clock signal. The 32 pixel clock delay circuit 110 ignores the first 32 pixels from the CCD before it produces a sensor linesync signal which indicates valid data from the CCD. The linesync signal that is input to the clock delay circuit 110 is also used to clock a counter 120 which produces, in the preferred embodiment, two binary outputs that can be used to determine which one line of a set of four lines is to be processed. The outputs of counter 120 are input to the circuit of FIG. 7 where they are used to select or discard sensor linesync signals.

Figure 7:
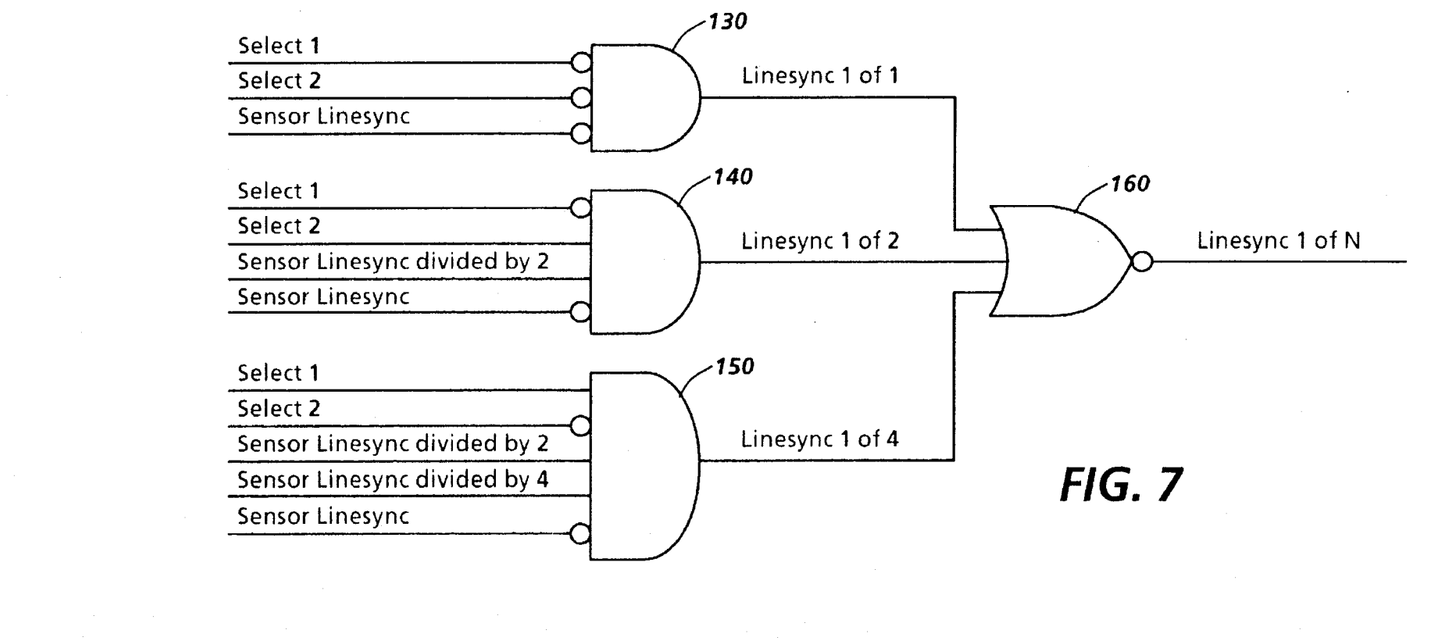
FIG. 7 is a block diagram illustrating a circuit for generating a linesync 1 of N signal in the present invention.

FIG. 7 illustrates a circuit which produces the linesync 1 of N signal. More specifically, AND gates 130, 140, and 150 produce the signals linesync 1 of 1, linesync 1 of 2, and linesync 1 of 4, respectively. These signals are fed into a NOR gate 160, which produces the linesync 1 of N signal to be utilized by a buffer control unit. For example the linesync 1 of 4 signal is the result of discarding 3 of every 4 sensor linesync signals. It is noted that FIG. 7 only illustrates the generation of three separate linesync signals. This circuit can be easily modified to include any number of linesync signals by increasing the number of AND gates and adding more select (control) bits and increasing the size of the counter 120.

Figure 8:
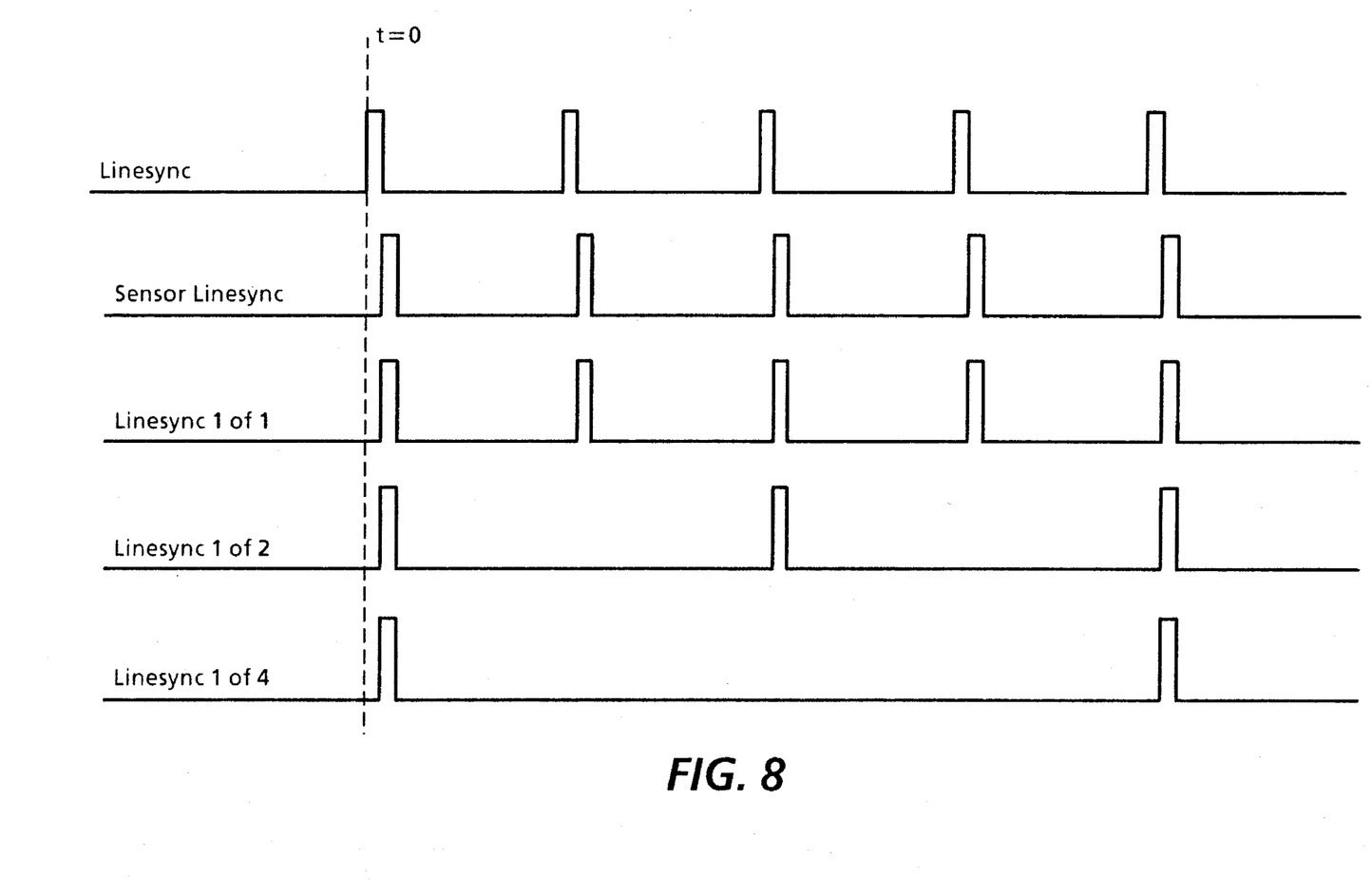
FIG. 8 is a timing diagram illustrating the generation the linesync 1 of N signal in the present invention.

FIG. 8 illustrates the timing diagram of the signals generated in FIG. 7 for three separate situations. In FIG. 8, the linesync signal corresponds to the signal generated by the IIT and the sensor linesync signal corresponds to the signal generated by the 32 pixel clock delay circuit 110. It is noted that the sensor linesync signal has the same periodicity as the linesync signal, but is delayed by 32 pixel clock cycles. The linesync 1 of 1 signal indicates the situation where every scanline from the image input terminal is transferred in a synchronous manner. In other words, the linesync 1 of 1 signal corresponds directly to the sensor linesync signal. The linesync 1 of 2 signal corresponds to the situation where every other scanline of valid image data from the IIT is transferred. Thus, the linesync 1 of 2 signal is generated for every two linesync 1 of 1 signals. The linesync 1 of 4 signal corresponds to the situation where one out of every four scanlines of valid image data generated by the IIT is transferred. Thus, a linesync 1 of 4 signal is generated for every four linesync 1 of 1 signals.

Figure 9:
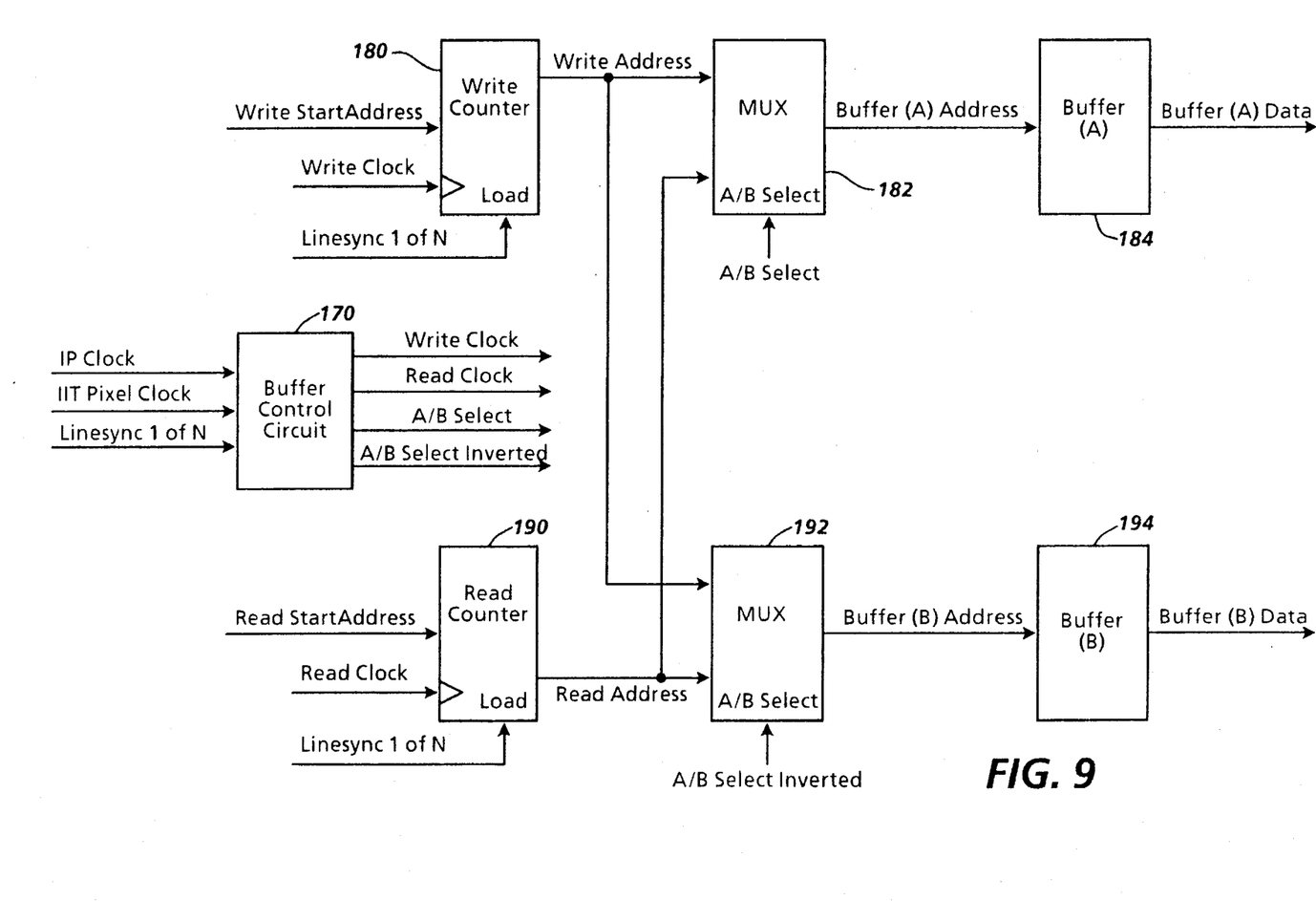
FIG. 9 is a block diagram illustrating one embodiment of an address control circuit for the present invention.

FIG. 9 illustrates a scanline buffer address control circuit without 180 degree rotation. A buffer control circuit 170 controls the various operations of the address control circuit in response to an image processing (IP) clock signal, a IIT pixel clock signal, and a linesync 1 of N signal. The buffer control circuit 170, in response to these input signals, produces a write clock signal, a read clock signal, an A/B select signal, and an inverted A/B select signal. The scanline buffer address control circuit includes two counters 180 and 190.

Counter 180 is utilized to generate the write address for either Buffer(A) 184 or Buffer(B) 194. Counter 180 is loaded with a predetermined write start address in response to the load function being activated by the linesync 1 of N signal. A write clock signal is also fed into counter 180 in order to change the write address. The write clock signal is derived from the the IIT pixel clock input to the buffer control circuit 170. The write address output from counter 180 is fed into multiplexer 182 and multiplexer 192.

Multiplexer 182 and 192 determine whether the write address is fed to either Buffer(A) 184 or Buffer(B) 194 in response to the A/B select signal and inverted A/B select signal, respectively.

Counter 190 produces the read address to be utilized by Buffer(A) 184 and Buffer(B) 194. A predetermined read start address is loaded into counter 190 in accordance with the linesync 1 of N signal activating the load function. A read clock signal is also fed into counter 190 in order to change the read address. The read clock signal is derived from the IP clock signal to the buffer control circuit 170. The read address output from the counter 190 is fed into multiplexer 182 and multiplexer 192. The selection of the read address for either Buffer(A) 184 or Buffer(B) 194 is controlled by the A/B select signal and inverted A/B select signal, respectively. Accordingly, when multiplexer 182 is feeding the write address to Buffer(A) 184, multiplexer 192 is feeding the read address to Buffer(B) 194. Thus, Buffer(A) can be storing image data from the IIT, while Buffer(B) can be transferring image data.

Figure 10:
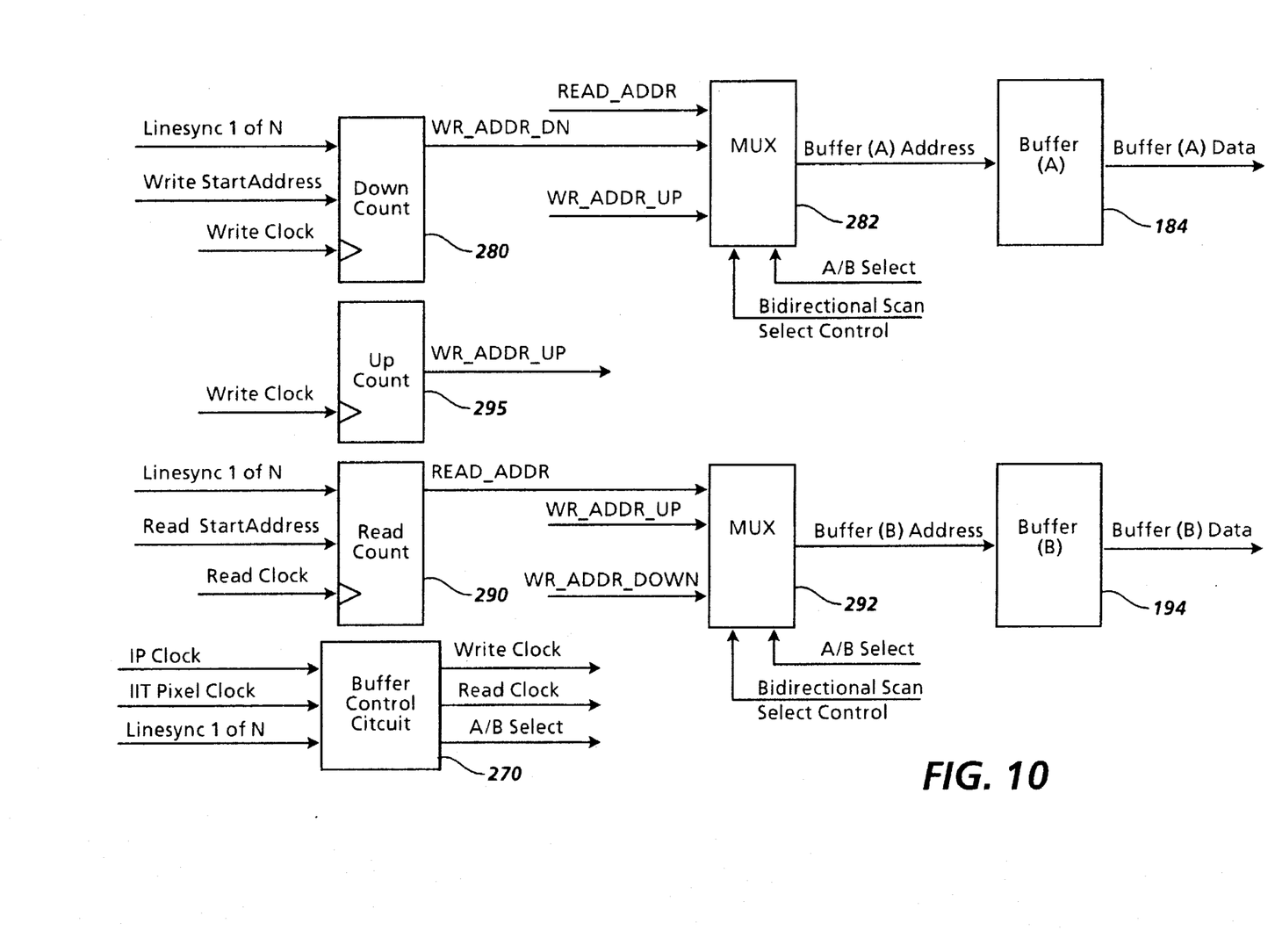
FIG. 10 is a block diagram illustrating another embodiment of an address control circuit for the present invention.

FIG. 10 illustrates a preferred embodiment of the output buffer which allows for 180° rotation in the IIT. In this embodiment, a buffer control circuit 270 receives an image processing (IP) clock signal, an IIT pixel clock signal, and a linesync 1 of N signal. From these input signals, the buffer control circuit 270 produces a write clock signal, a read clock signal, and an A/B select signal. FIG. 10 operates in much the same manner as FIG. 9, except that FIG. 10 has two separate counters to produce the write addresses. More specifically, FIG. 10 illustrates the utilization of a write-down counter 280 and a write-up counter 295. The read counter 290 in FIG. 10 operates in the same manner as counter 190 of FIG. 9.

To enable the 180° rotation, FIG. 10 includes two multiplexers 283 and 293. Each multiplexer receives a read address from read counter 290 and a write-up address and a write-down address from counters 295 and 280, respectively. An A/B select signal is also fed to the two multiplexers 283 and 293 to enable the multiplexers to choose between the read address or the write addresses. Thus, the A/B select signal operates in essentially the same manner as the A/B select signal and inverted A/B select signal of FIG. 9.

To effectuate 180° rotation, a bidirectional scan select control signal is fed to each multiplexer 283 and 293. The bidirectional scan select control signal enables the selection of either the write-down address when rotation is not desired or the write-up address when 180° rotation is desired. In other words, to accomplish rotation, the image data from the is written into the buffer in the opposite direction from which signal corresponding to the clock rate of the image processing system such that the video data output from the register 107(1) is serial input to the image processing system.

To clarify the description of the present invention, the operations of the present invention will be explained in more detail below in conjunction with the drawings and Tables 1–3.

Table 1 shows the situation when the image data generation rate of the image input terminal is equal to the throughput rate of the image processing system and a normal synchronous operation. In this situation, during each integration period, image data is formed by the CCD sensors and stored in the buffer. Also, during a single integration period, the stored image data in the buffer is transferred to the image processing system.

TABLE 1

| DEVICE | INTEGRATION PERIOD 1 | INTEGRATION PERIOD 2 | INTEGRATION PERIOD 3 | INTEGRATION PERIOD 4 | INTEGRATION PERIOD 5 | INTEGRATION PERIOD 6 | INTEGRATION PERIOD 7 | INTEGRATION PERIOD 8 | INTEGRATION PERIOD 9 |
|---|---|---|---|---|---|---|---|---|---|
| CCD | output d1 | output d2 | output d3 | output d4 | output d5 | output d6 | output d7 | output d8 | output d9 |
| BUFFER | store d1 | store d2 | store d3 | store d4 | store d5 | store d6 | store d7 | store d8 | store d9 |
| I/O | X | output d1 | output d2 | output d3 | output d4 | output d5 | output d6 | output d7 | output d8 | it is read out. The proper addresses as selected by the multiplexers 283 and 293 are fed to Buffer(A) 184 and Buffer(B) 194 so that the proper operations can be carried out as described above. The bidirectional scan select control signal can be generated by either a control unit or user interface when establishing the status of the rotation state.

Figure 4:
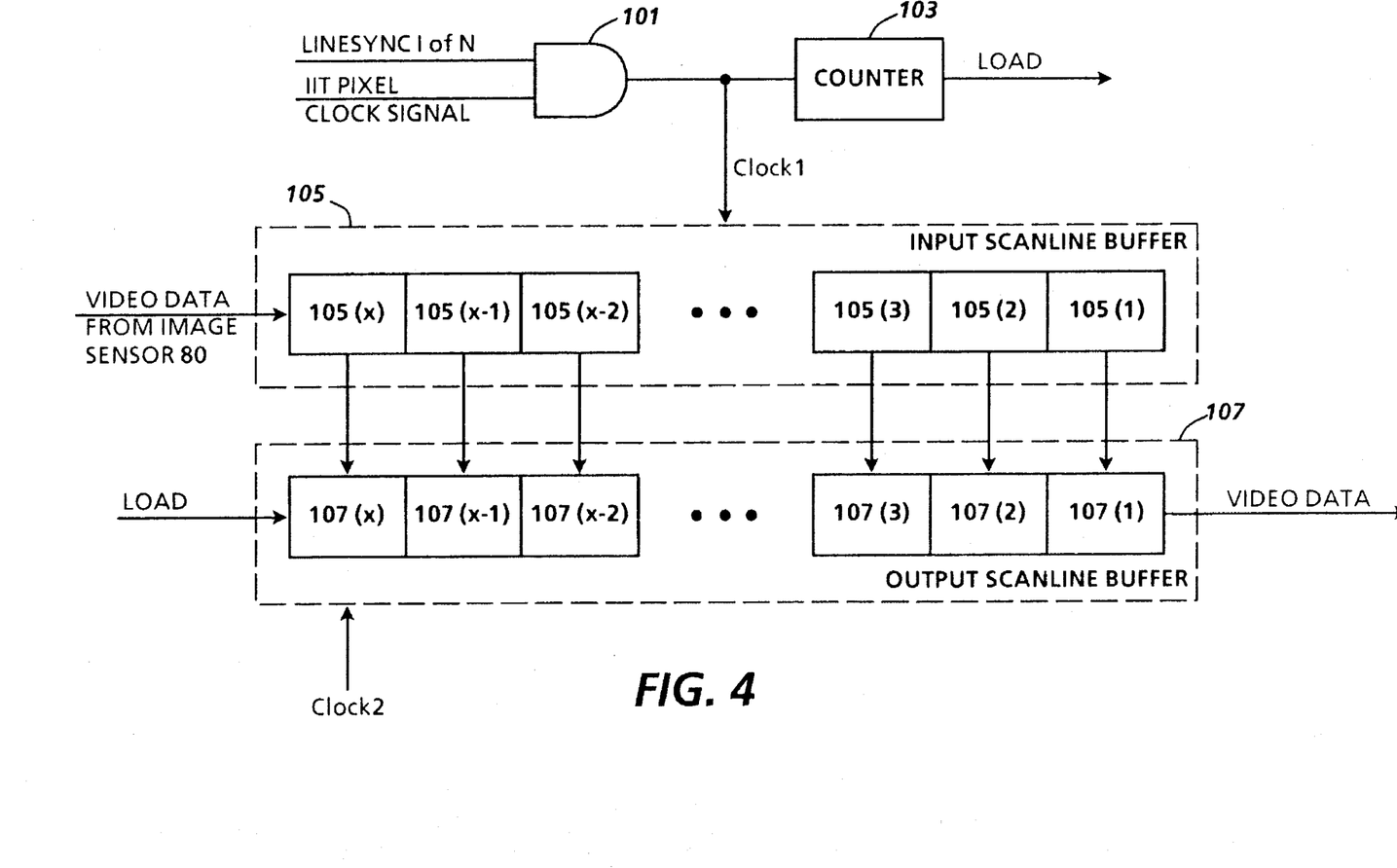
FIG. 4 is a block diagram showing the buffering operations of one embodiment of the present invention.

FIG. 4 illustrates another embodiment of the scanline buffer circuit 40 of FIG. 2. In FIG. 4, video data from the image sensor 80 is fed into an input scanline buffer 105 containing a plurality of memory locations. More specifically, each memory address 105(1), 105(2), 105(3) . . . to 105(x–2), 105(x–1), 105(x), stores data for an individual pixel within a scanline. Data corresponding to the first pixel of a scanline is input into the memory address 105(x) and then the pixel data is shifted to the next memory location (105(x–1)) in the array in response to a pixel clock signal. The input scanline buffer 105 operates like a shift register having the capacity to hold one scanline of image data. In response to a load signal that is derived from the linesync signals generated for indicating the end of a scanline, the contents of input scanline buffer 105 are loaded into output scanline buffer 107 with the contents of 105(x) being transferred to 107(x), the contents of 105(x–1) being transferred to 107(x–1), and the contents of 105(x–2) being transferred to 107(x–2), etc.

After being loaded into the output scanline buffer 107, the video data is again shifted right in response to a second clock For example, during integration period 1, as shown in Table 1, the array of CCD sensors outputs a single scanline of valid image data, d1. During integration period 1, this single scanline of valid image data, d1, is stored in a first buffer. At the end of integration period 1, the first buffer begins transferring the data, d1, to the image processing system to be carried out during integration period 2, while the array of CCD sensors outputs another single scanline of valid image data, d2, wherein this single scanline of valid image data, d2, is stored in a second buffer. Moreover, during integration period 2, the contents of output scanline buffer 107 are fully transferred to the image processing system. At the end of integration period 2, the second buffer begins transferring data, d2, to the image processing system while the first buffer begins receiving data, d3. Thus, the process begins again.

Table 2 shows an operation where the image data generation rate of the image input terminal is greater than the throughput rate of the image processing system. In this situation, during each integration period, image data is formed by the CCD sensors. However, in contrast to the situation shown in Table 1, not all the scanlines of valid image data are stored in the buffer. Moreover, the throughput rate of the image processing system requires two integration periods to properly process a single scanline of valid image data from the image input terminal.

TABLE 2

| DEVICE | INTEGRATION PERIOD 1 | INTEGRATION PERIOD 2 | INTEGRATION PERIOD 3 | INTEGRATION PERIOD 4 | INTEGRATION PERIOD 5 | INTEGRATION PERIOD 6 | INTEGRATION PERIOD 7 | INTEGRATION PERIOD 8 | INTEGRATION PERIOD 9 |
|---|---|---|---|---|---|---|---|---|---|
| CCD | output d1 | output d2 | output d3 | output d4 | output d5 | output d6 | output d7 | output d8 | output d9 |
| BUFFER | store d1 | skip d2 | store d3 | skip d4 | store d5 | skip d6 | store d7 | skip d8 | store d9 |
| I/O | X | output d1 | output d1 | output d3 | output d3 | output d5 | output d5 | output d7 | output d7 |

During integration period 1, as shown in Table 2, the array of CCD sensors outputs a single scanline of valid image data, d1. During integration period 1, this single scanline of valid image data, d1, is stored in a first buffer. At the end of integration period 1, the first buffer begins transferring the data, d1, while the array of CCD sensors outputs another single scanline of valid image data, d2. It is noted that during integration period 2, a portion of the contents of the first buffer is transferred. The single scanline of valid image data, d2, produced during integration period is not stored in a buffer, but is actually skipped or discarded.

Figure 11:
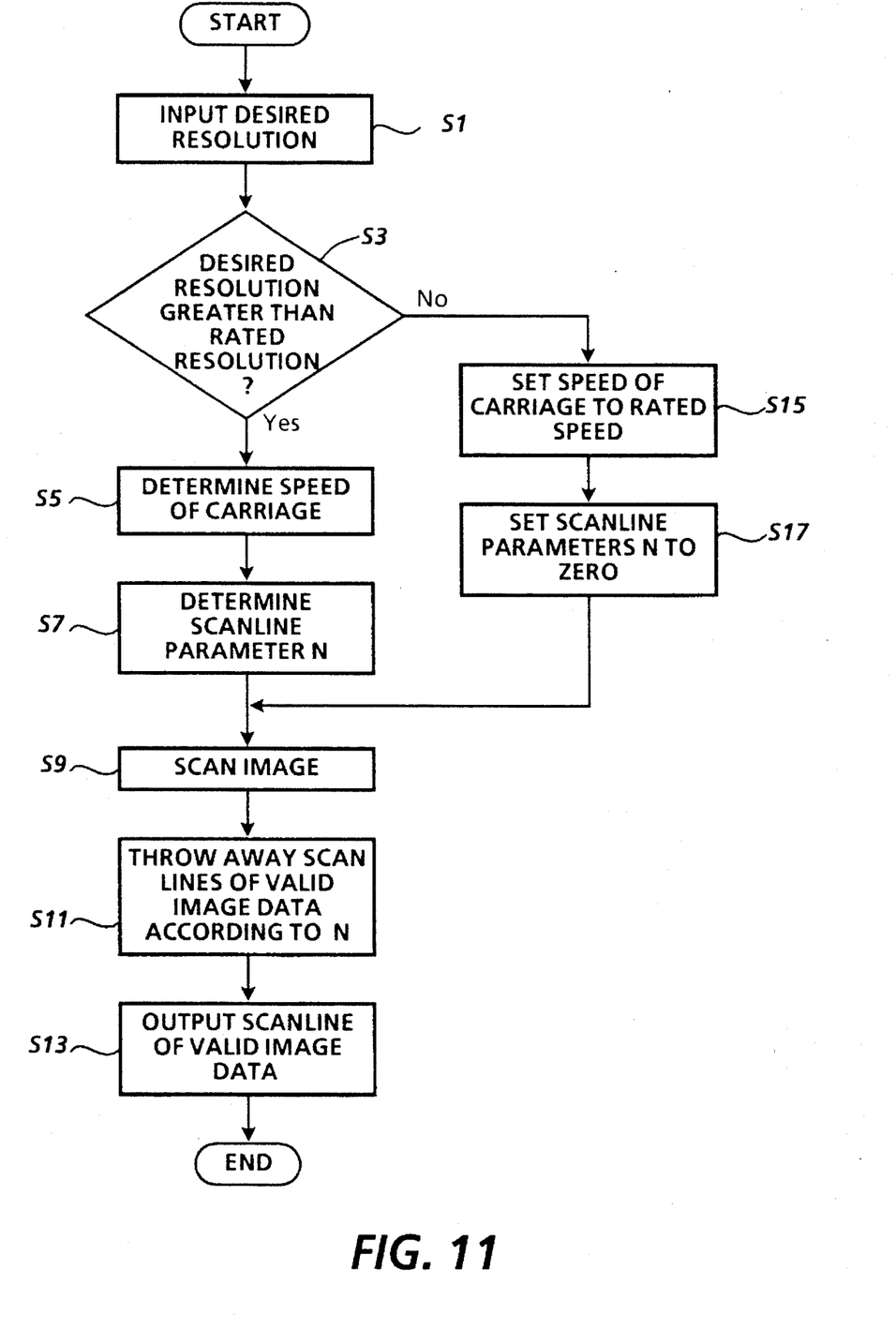
FIG. 11 is a flowchart illustrating a method for carrying out one embodiment of the present invention.

The array of CCD sensors outputs another single scanline of valid image data, d3, wherein this single scanline of valid image data, d3, is stored in a second buffer during integration period 3. Moreover, the final portion of the contents of the first buffer is transferred. At the end of integration period 3, the second buffer begins transferring its contents, d3, and the process begins again. Table 3 shows another operation where the image processing system requires four integration periods to properly process a single scanline of valid image data from the image input terminal.

the present invention, at step S15, sets the speed of the carriage in a platen type scanner to the scanner's rated speed at the desired resolution. The present invention then sets the throw away parameter of the discard to transfer ratio to 0 (N=1, D=0).

If the present invention, at step S3, determines that the desired resolution generates data faster than the maximum throughput rate of the system, the present invention determines the speed of the carriage for a platen type scanner at step S5. For example, if the systems maximum throughput corresponds to a a 600 spot per inch resolution, and the desired resolution is 1200 spots per inch, the present invention will determine the speed of the carriage to be half of the rated speed. After determining the speed of the carriage, step S7 determines the parameter N and D. In the example discussed above, the scanline parameter N would be set to 2 and D set to 1.

The process then proceeds to step S9 after executing either step S7 or step S17. At step S9, the process scans the image, and at step S11, the present invention throws away D scanlines of valid image data out of N scanlines. Finally, step

TABLE 3

| DEVICE | INTEGRATION PERIOD 1 | INTEGRATION PERIOD 2 | INTEGRATION PERIOD 3 | INTEGRATION PERIOD 4 | INTEGRATION PERIOD 5 | INTEGRATION PERIOD 6 | INTEGRATION PERIOD 7 | INTEGRATION PERIOD 8 | INTEGRATION PERIOD 9 |
|---|---|---|---|---|---|---|---|---|---|
| CCD | output d1 | output d2 | output d3 | output d4 | output d5 | output d6 | output d7 | output d8 | output d9 |
| BUFFER | store d1 | skip d2 | skip d3 | skip d4 | store d5 | skip d6 | skip d7 | skip d8 | store d9 |
| I/O | X | output d1 | output d1 | output d1 | output d1 | output d5 | output d5 | output d5 | output d5 |

The situation shown in Table 3 is similar to that shown by Table 2, thus only the differences will be discussed for the sake of brevity. In the situation of Table 3, a buffer transfers approximately one fourth of its contents each integration period; therefore, the data transfer buffer circuit only stores one out of four scanlines of valid image data.

As shown by Table 3, by skipping three out of four scanlines of valid image data and maintaining the integration period at a constant rate, a synchronous transfer can be realized.

FIG. 11 illustrates a flowchart showing a method for carrying out one embodiment of the present invention. As illustrated in FIG. 11, at step S1, the user inputs a desired resolution at which the image is to be scanned. At step S3, the present invention determines whether the throughput at the desired resolution input at step S1 is greater than the rated throughput of the scanner. If the throughput at the desired resolution is not greater than the rated throughput, S13 outputs the scanlines of valid image data which were not thrown away in step S11.

Figure 12:
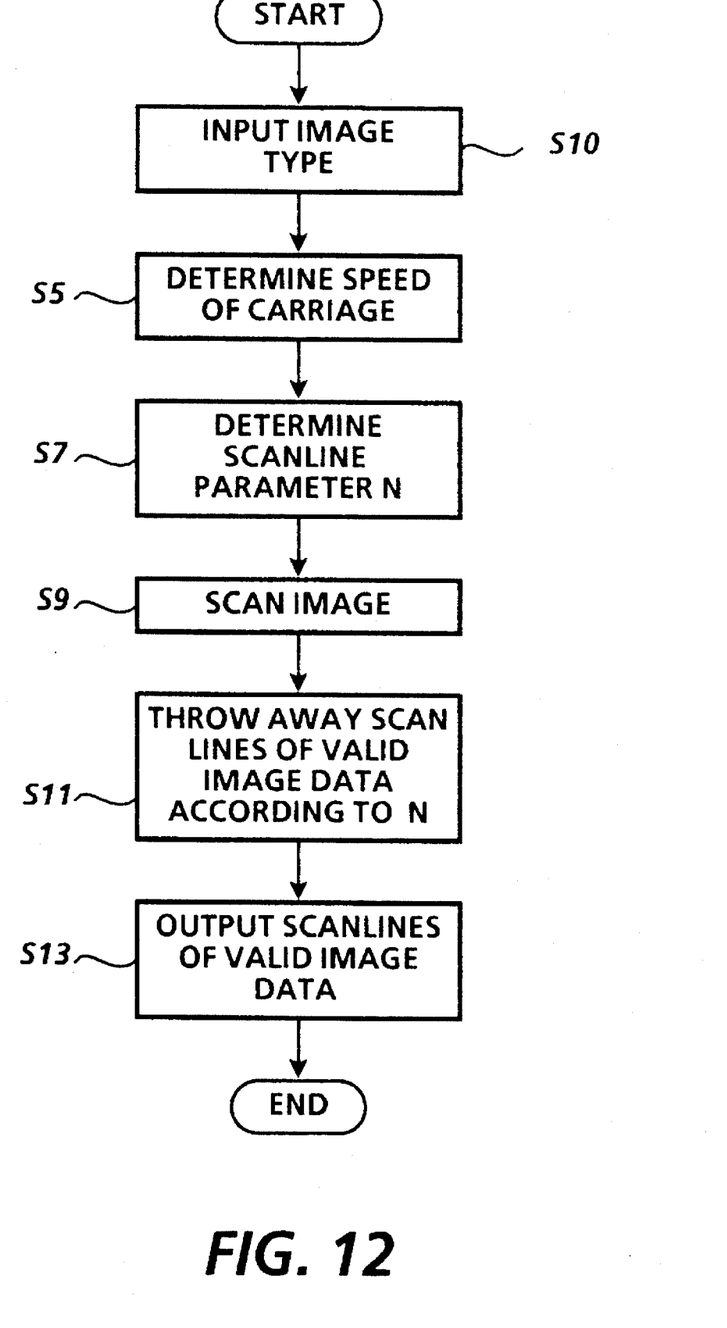
FIG. 12 is a flowchart illustrating a method for carrying out another embodiment of the present invention.

FIG. 12 illustrates a flowchart showing a process for carrying out another embodiment of the present invention. As illustrated in FIG. 12, step S10 enables a user to input the image type to be scanned. For example, the user, through end user interface, can input either directly or indirectly via automatic image type sensing, whether the image is a text type, halftone type, continuous tone, or a mix thereof. From this received image type information, the process, at step S5, determines the speed of the carriage for scanning for a platen type scanner. After determining the speed of the carriage, the process determines the parameter N and D at step S7. The process then continues to carry out the execution of steps S9, S11 and S13. These steps perform the same functions as the corresponding steps discussed above with respect to FIG. 11.

Figure 13:
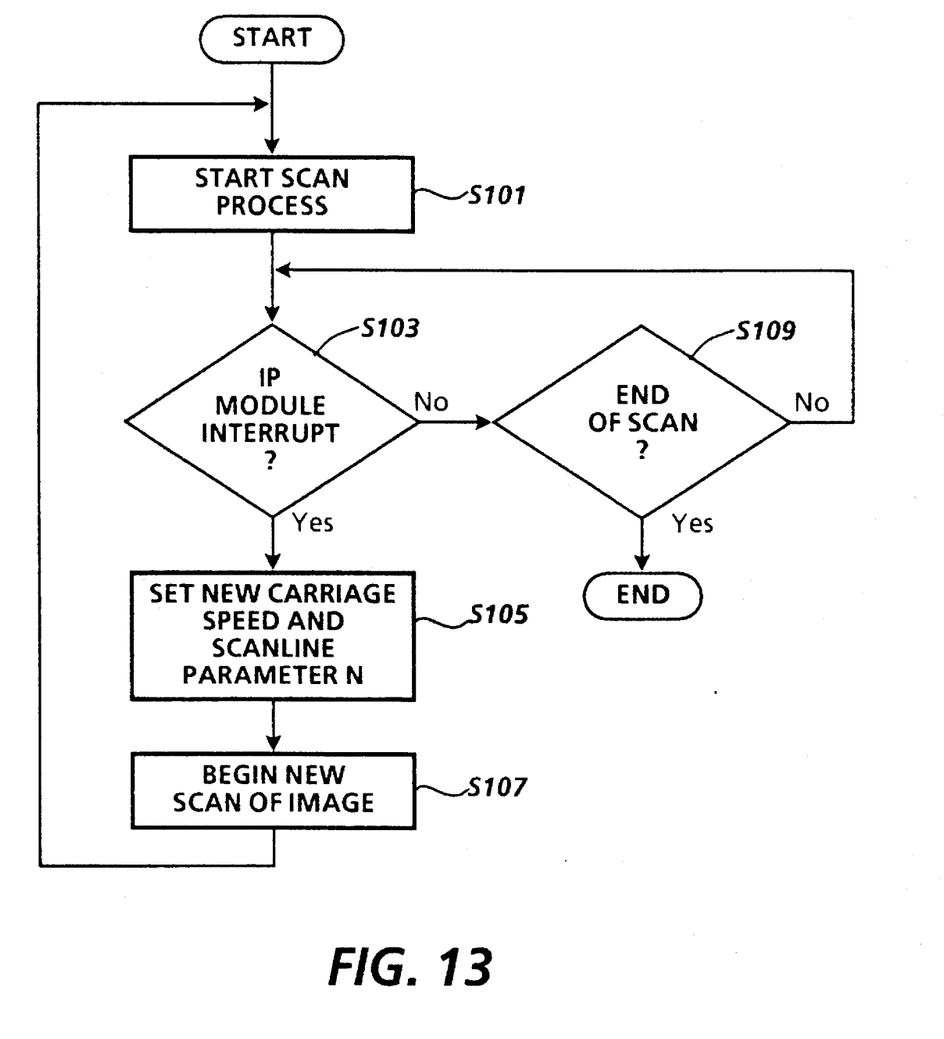
FIG. 13 is a flowchart illustrating a method for carrying out a third embodiment of the present invention.

FIG. 13 illustrates a flowchart showing a process for carrying out a third embodiment of the present invention. In this process, step S101 starts a scan process usually in response to a start command received from the user interface. The scanning process continues until either an image processing module output signal is received at step S103 or an image complete signal is received at step S109.

If an image processing module output signal is received at step S103, the process determines a new carriage speed and parameter N and D at step S105. In the preferred embodiment of the present invention, the process merely increases the scanline parameter N by a whole number and sets the new carriage speed to match this new scanline parameter. After setting the new carriage speed and scanline parameter N, the process begins the new scanning of the image utilizing the new carriage speed and scanline parameter N at step S107.

The present invention reduces the effective image data generation rate of the image input terminal while leaving integration time of the image sensor unchanged. This is accomplished by moving the optical system or document at a slower speed and skipping a selected number of scanlines of valid image data in a periodic manner. Thus, the image is sampled at a higher (slow scan) resolution and the data is only output periodically to allow the image processing system to keep up with the image data generation rate of the image input terminal. The slow scan speed and periodic line sampling rates are selected by the image input terminals microprocessor based on the resolution of the image data, the type of the image data, and the throughput rate of the image processing system.

To realize the masking of the image data generation rate of the IIT, the present invention utilizes a binary counter and state decoder to count scanlines from the image sensing circuitry. The buffer is used to absorb the image input terminal video or image data, and a line signal from the image sensor 80 is used to clock a counter. The outputs of the counter are used in conjunction with a microprocessor which outputs signals used to derive the linesync 1 of N signal The linesync 1 of N signal is generated by selecting one of every N image sensor linesync cycles where (N−1) is a number of scanlines of the valid video data to be discarded.

When the linesync 1 of N signal is in a logical inactive state video data coming from the image sensor is suppressed. More specifically, a buffer, when the linesync 1 of N signal is inactive, will not store or clock-in any data from the image sensor 80. In conjunction with the line selection logic, the scan speed of the optics or document is changed by the ratio of the selected lines of video data to the actual lines of video produced by the sensor. The function of the scanline buffer is to accept image data at the IIT's image data generation rate and output image data at the throughput rate of the image processing system.

To accomplish this process, the scanline buffer control circuitry is used to generate two sets of timing signals for the buffer. The input side of the buffer is filled with a scanline of image data in synchronism with the output pixel transfer rate of the preceding circuitry or block. The output side of the buffer provides data synchronously with a slower clock which is compatible with the throughput rate of the following circuitry. Image data is read from a buffer and during the entire period which the linesync 1 of N signal is both logically active and inactive. However, a scanline buffer is filled only while the linesync 1 of N signal is logically active. Therefore, the amount of time available to move a scanline of image data over to the image processing system is increased without sacrificing synchronization.

In summary, the present invention addresses the situation of differing rates by utilizing a synchronous approach. The present invention synchronously outputs image data which is scanned at a rate exceeding the maximum throughput rate without experiencing the problems associated with the utilization of an asynchronous operation; the interruption of the integration period or process; and the interpolation of image data to ensure a composite line of image data.

In the synchronous operation of the present invention, the image input terminal scans the entire document at a constant, but slower, rate, while maintaining and not interrupting the integration period. This scanning process increases the number of scanlines of available valid image data and enables an apparent or virtual image data generation rate equal to the throughput rate of the image processing system, thereby providing synchronized transfer of data between devices when the generation rate of the image input terminal exceeds the throughput rate.

For example, the present invention can transfer video data from an image input terminal to an image processing module when the image processing module has a throughput rate slower than a data generation rate of the image input terminal. In this situation, the present invention receives scanning parameters concerning the image type or image resolution through a conventional automatic image type discrimination circuit or a user interface. Upon receiving this information, a controller sets a scanline parameter N and a discard parameter D based on the received scanning parameters. The parameter N corresponds to a predetermined portion of an image that will be scanned. In other words, the relationship between N and D is such that D represents the number of scanlines out of N scanlines that are to be discarded, thus N can be set to any arbitrary number, but it is preferable to set N to a value which produces a whole number ratio between N and D. Upon setting these values a scanning device scans a predetermined portion of the image and produces a set of N scanlines of valid image data. The scanned image data is fed to a buffer but only N-D scanlines of valid image data are stored in the buffer. Thereafter, an interface outputs the stored scanlines of image data to the image processing module.

In another example, the present invention can transfer video data from an image input terminal to an image processing module when the throughput rate of the image processing module becomes slower than a data generation rate of the image input terminal during the processing of a document. In this situation, a controller sets a scanline parameter N and a discard parameter D based on the received scanning parameters. The parameter N corresponds to a predetermined portion of an image that will be scanned. In other words, the relationship between N and D is such that D represents the number of scanlines out of N scanlines that are to be discarded, thus N can be set to any arbitrary number, but it is preferable to set N to a value which produces a whole number ratio between N and D. Upon setting these values a scanning device scans a predetermined portion of the image and produces a set of N scanlines of valid image data. The scanned image data is fed to a buffer but only N-D scanlines of valid image data are stored in the buffer. Thereafter, an interface outputs the stored scanlines of image data to the image processing module. The image processing module includes an output signal generation circuit which produces an output signal when an image data generation rate of the image input terminal exceeds an image throughput rate of the image processing module. In response to this signal, the controller resets the scanline parameter N and discard parameter D to new values and causes the scanning device to re-scan the image according to the newly set parameters.

Although the present invention has been described in detail above, various modifications can be implemented without imparting from the spirit. For example, the type of data, although only described in detail with respect to image data, may be video data or any data being transferred between devices.

Moreover, the present invention has been described with respect to the number of discarded scanlines being equal to N–1. However, the number of discarded lines could be any number that would be less than N so long as the number of discarded scanlines allows the host terminal ample time to receive the data. More specifically, the number of discarded scanlines could be one out of three (N–2).

The number of scanlines to be discarded from the predetermined set can be determined by the image input terminal based on the specifications of the data to be transferred and the throughput rate of the image processing system. If the difference is a fraction of period that is required for the image input terminal to present a scanline of valid data to the buffer, the discard number is rounded up to insure proper transfer.

While the invention has been described with reference to various embodiment disclosed above, it is not confined to the details set forth above, but is intended to cover such modifications or changes as may come within the scope of the attached claims.

What is claimed is:

1. A system for Synchronously transferring video data representing a scanned image from an image input terminal to an image processing module, the image processing module having a throughput rate slower than a data generation rate of the image input terminal, comprising:

input means for inputting a scanning parameter;

control means for setting, prior to scanning an image, a scanline parameter N and a discard parameter D based on the received scanning parameter and a maximum image processing module throughput;

image means, operatively connected to said control means, for scanning a predetermined portion of the image and for producing a set of N scanlines of valid image data therefrom, buffer means, operatively connected to said control means, for storing N-D scanlines of valid image data; and interface means, operatively connected to said buffer means, for outputting the stored scanlines of image data to the image processing module.

2. The system as claimed in claim 1, wherein N is equal to 2 and D is equal to 1.

3. The system as claimed in claim 1, wherein N is equal to 3 and D is equal to 1.

4. The system as claimed in claim 1, wherein N is equal to 3 and D is equal to 2.

5. The system as claimed in claim 1, wherein N is a whole number equal to or greater than 2 and D is equal to N–1.

6. The system as claimed in claim 1, wherein said scanning parameter is image type information;

said control means setting the scanline parameter N and the discard parameter D based on the image type information.

7. The system as claimed in claim 1, wherein said scanning parameter is a scanning resolution;

said control means setting the scanline parameter N and the discard parameter D based on the scanning resolution.

8. A method for synchronously transferring video data representing a scanned image from an image input terminal to an image processing module, the image processing module having a throughput rate slower than a data generation rate of the image input terminal, comprising the steps of:

(a) inputting a scanning parameter;

(b) setting, prior to scanning an image, a scanline parameter N and a discard parameter D based on the received scanning parameter and a maximum image processing module throughput;

(c) scanning, after the execution of said step (b), a predetermined portion of the image, and for producing a set of N scanlines of valid image data therefrom;

(d) storing N-D scanlines of valid image data; and (e) outputting the stored scanlines of image data to the image processing module.

9. The method as claimed in claim 8, wherein N is equal to 2 and D is equal to 1.

10. The method as claimed in claim 8, wherein N is equal to 3 and D is equal to 2.

11. The method as claimed in claim 8, wherein N is equal to 4 and D is equal to 3.

12. The method as claimed in claim 8, wherein N is a whole number equal to or greater than 2 and D is equal to N–1.

13. The method as claimed in claim 8, wherein the scanning parameter is image type information;

said step (b) setting the scanline parameter N and the discard parameter D based on the image type information.

14. The method as claimed in claim 8, wherein the scanning parameter is a scanning resolution;

said step (b) setting the scanline parameter N and the discard parameter D based on the scanning resolution.

15. A system for synchronously transferring video data representing a scanned image from an image input terminal to an image processing module, the image processing module having a throughput rate slower than a data generation rate of the image input terminal, comprising:

control means for setting, prior to scanning an entire image, an initial scanline parameter N and an initial discard parameter D;

image means, operatively connected to said control means, for scanning a predetermined portion of the entire image and for producing a set of N scanlines of valid image data therefrom;

buffer means, operatively connected to said control means, for storing N-D scanlines of valid image data;

interface means, operatively connected to said buffer means, for outputting the stored scanlines of image data to the image processing module;

image processing module interrupt means for producing an interrupt signal when an image data generation rate of the image input terminal exceeds an image throughput rate of the image processing module;

said control means resetting the scanline parameter N and discard parameter D to new values and causing said imaging means to re-scan the entire image according to the newly set parameters in response to the interrupt signal from said image processing module interrupt means.

* * * * *